US006064699A

United States Patent [19]

Law

[11] Patent Number: 6,064,699

[45] Date of Patent: May 16, 2000

[54] WIRELESS SPEAKER SYSTEM FOR TRANSMITTING ANALOG AND DIGITAL INFORMATION OVER A SINGLE HIGH-FREQUENCY CHANNEL

[75] Inventor: Wilson Law, Kowloon, The Hong Kong Special Administrative Region of the People's Republic of China

[73] Assignee: Golden Eagle Electronics Manufactory Ltd., Tsuen Wan, The Hong Kong Special Administrative Region of the People's Republic of China

[21] Appl. No.: 08/888,682

[22] Filed: Jul. 7, 1997

[51] Int. Cl.⁷ .................................................... H04B 14/06

[52] U.S. Cl. .......................... 375/244; 375/295; 375/316; 455/102; 455/103; 704/500

[58] Field of Search .................................... 375/216, 242, 375/244, 245, 247, 295, 316; 341/143; 381/2, 77, 80, 81, 82; 455/102, 103; 704/500, 501

[56] References Cited

U.S. PATENT DOCUMENTS

| | | | |
|---|---|---|---|
| 3,686,431 | 8/1972 | Kitaoka et al. | 178/5.8 |
| 4,139,866 | 2/1979 | Wegner | 358/198 |
| 4,215,247 | 7/1980 | Lambert | 179/18 BC |
| 4,259,746 | 3/1981 | Sandstedt | 455/600 |
| 4,485,483 | 11/1984 | Torick et al. | 381/14 |
| 4,739,413 | 4/1988 | Meyer | 358/281 |
| 4,771,344 | 9/1988 | Fallacaro et al. | 358/335 |
| 4,829,578 | 5/1989 | Roberts | 381/46 |
| 4,847,903 | 7/1989 | Schotz | 381/3 |
| 4,939,770 | 7/1990 | Makino | 379/61 |
| 4,980,665 | 12/1990 | Schotz | 340/310 |
| 4,984,296 | 1/1991 | Schotz | 455/193 |
| 5,012,350 | 4/1991 | Streck et al. | 358/335 |
| 5,023,933 | 6/1991 | Karkota, Jr. | 455/45 |
| 5,151,668 | 9/1992 | Kim | 332/124 |
| 5,299,264 | 3/1994 | Schotz et al. | 381/14 |
| 5,349,386 | 9/1994 | Borchardt et al. | 348/485 |
| 5,553,079 | 9/1996 | Niki et al. | 370/110.4 |
| 5,745,525 | 4/1998 | Hunsinger et al. | 375/285 |
| 5,867,223 | 2/1999 | Schindler et al. | 348/552 |
| 5,915,237 | 6/1999 | Boss et al. | 704/258 |

OTHER PUBLICATIONS

Brian C. Fenton, Some Happenings at the FCC, Radio Electronics, Nov. 27, 1987.

*Primary Examiner*—Amanda T. Le
*Assistant Examiner*—Dac V. Ha
*Attorney, Agent, or Firm*—Cohen, Pontani, Lieberman & Pavane

[57] ABSTRACT

A wireless speaker system that transmits and receives both analog and digital audio signals simultaneously over a single channel at frequencies above 900 MHz. The present invention advantageously uses continuously variable slope delta (CVSD) modulation to perform analog-to-digital (A/D) and digital-to-analog (D/A) conversion of audio signals in the transmitter and receiver, respectively, using complementary filters and CVSD modulation circuits in both the transmitter and receiver. Analog signals are modulated in the transmitter with a high-frequency carrier and band-pass filtered before being combined with the digitized audio signal to modulate a high-frequency carrier, i.e. over 900 MHz, which is transmitted to the receiver. Similarly, the receiver band-pass filters and demodulates the received signal to recover the analog signal components.

23 Claims, 16 Drawing Sheets

WIRELESS SPEAKER SYSTEM FOR TRANSMITTING ANALOG AND DIGITAL INFORMATION OVER A SINGLE HIGH-FREQUENCY CHANNEL

BACKGROUND OF THE INVENTION

1. Field of the Invention

The present invention relates to a wireless speaker system and, more particularly, to a wireless speaker system for transmitting and receiving digital and analog audio signals over a single high-frequency channel at frequencies above 900 MHz.

2. Description of the Related Art

With the advent of home theater systems and with high definition television rapidly becoming a commercially viable technology, speaker systems must be available for the home audiophile that are suitable for such high-fidelity use. Wireless speaker systems provide a particularly attractive solution since installation does not require extensive and possibly expensive wiring. In addition, wireless speaker systems may be moved about within a room to obtain optimum performance or, alternatively, may be moved from room-to-room or even from house to house with minimal inconvenience.

A variety of wireless stereo speaker systems are now commercially available. These systems have used a variety of either analog transmission techniques or digital transmission techniques to communicate audio signals wirelessly from a transmitter to a receiver. The drawbacks of such systems, however, is that by utilizing, for example, only analog transmission techniques, the high fidelity benefits resulting from digitized signal are not present. Likewise, by utilizing only a digital transmission technique, the benefits of an analog signal are absent. Accordingly, there exists a need for a wireless speaker system utilizing both digital and analog transmitting techniques so that the reproduced audio signal obtains the benefits associated with both digital and analog signal reproduction.

SUMMARY OF THE INVENTION

The present invention provides a wireless, high-fidelity audio system which utilizes the wide bandwidth now available for consumer electronics, namely, frequencies above 900 MHz. The present invention also advantageously uses a wide-band wireless channel to avoid interference from relatively narrow-band radiators such as cellular phones, pagers, walkie-talkies, etc.

The present invention is directed generally to a wireless speaker system that transmits and receives both analog and digital audio signals simultaneously over a single channel at frequencies above 900 MHz. This is accomplished by using continuously variable slope delta (CVSD) modulation to perform analog-to-digital (A/D) and digital-to-analog (D/A) conversion of audio signals in the transmitter and receiver, respectively, using complementary CVSD modulation circuits in both the transmitter and receiver. Analog signals are modulated in the transmitter with a high-frequency carrier and band-pass filtered before being combined with a digitized audio signal to modulate a high-frequency carrier, i.e. over 900 MHz, which is transmitted to the receiver. Similarly, the receiver filters and demodulates the received signal to recover the analog signal components.

The transmitter connects to an audio signal source such as, for example, a stereo receiver, video-cassette recorder (VCR), television (TV) set, or the like. The receiver connects to an audio signal destination such as, for example, a speaker.

In a particularly preferred embodiment, a plurality of audio signal sources may be connected to a single transmitter. Using CVSD modulation, the transmitter separately digitizes the analog audio signals and then multiplexes the various digitized signals to form a digital frame, which includes synchronization data. The digital frame is further coded before modulating a high-frequency carrier for transmission to a plurality of receivers, with each receiver being configured to output an analog signal from only one of the plurality of audio sources.

In an alternative embodiment, less than all of the plurality of analog audio signals are digitized prior to transmission, i.e. some of the audio signals are transmitted as frequency modulated analog signals, rather than the frequency modulated coded digital frame previously described. The coded digital frame and analog signals are combined to modulate a high-frequency carrier prior to transmission. Here, some of the receivers will be tuned to receive signals of a specific frequency—those signals having originated from a particular audio signal source and having been transmitted as modulated analog signals—and some signals will be configured to receive digital signals. This is particularly desirable for more demanding audiophiles who may prefer to have digital-processed music mixed with analog-processed music. This embodiment provides a definite advantage over prior art wireless speaker systems utilizing analog-only or digital-only stereo multiplexing schemes.

Hence, the combination of two or more audio channels, higher signal to noise ratio, no frequency tuning requirement and indefinite audio channel separation, provides a much improved wireless speaker system.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

The present invention provides a novel and non-obvious wireless speaker system that transmits and receives both analog and digital audio signals simultaneously over a single high-frequency channel. A plurality of audio sources may be connected to a single transmitter that is configured for transmitting a digital, analog, or a combination digital and analog audio signal to an equal number of receivers, preferably connected to speakers or other similar audio signal destinations. In a preferred embodiment, a maximum of five separate audio sources will transmit signals to five receivers. The five audio sources may comprise, for example, the front (right, middle and left) and rear (right and left) audio signals of a surround-sound speaker system—these signals being obviously intended for reproduction at a specific speaker (i.e. a specific speaker location) or audio signal destination. Analog audio signals from the various audio sources may be separately digitized using CVSD modulation and multiplexed together with a synchronization bit to form a digital frame. The digital frame is then further processed to form a coded digital frame. Alternatively, or in addition to the above-described digitization scheme, the analog audio signals may be modulated with a high-frequency carrier and then band-pass filtered before being combined with the coded digital frame to modulate a high-frequency carrier, preferably over 900 MHz. This modulated combined analog and digital signal is then amplified and transmitted wirelessly to each of the remotely located receivers.

Each receiver is configured to receive the modulated analog and digital signals and to downconvert the high-frequency signal to an intermediate frequency signal which is then demodulated. The receivers are preferably pre-configured for either analog or digital signal processing—the analog signal components being band-pass filtered and the digital signal components being converted to analog, depending on the precise configuration of the receiver, before being provided to a speaker. Alternatively, the receivers may be configured for both analog and digital signal processing, such processing being mutually exclusive.

Figure 1:
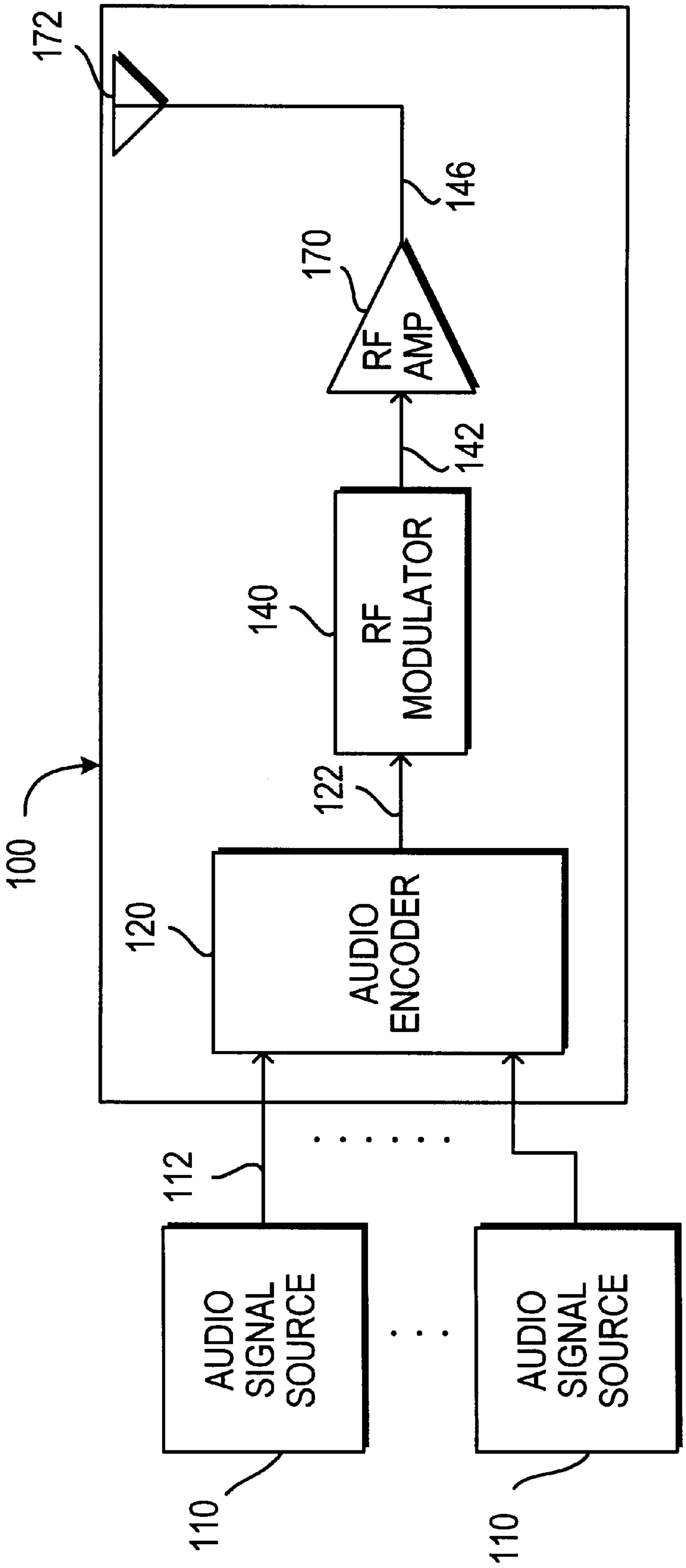
FIG. 1 is a block diagram of a transmitter of a wireless speaker system configured according to the present invention.
Figure 2:
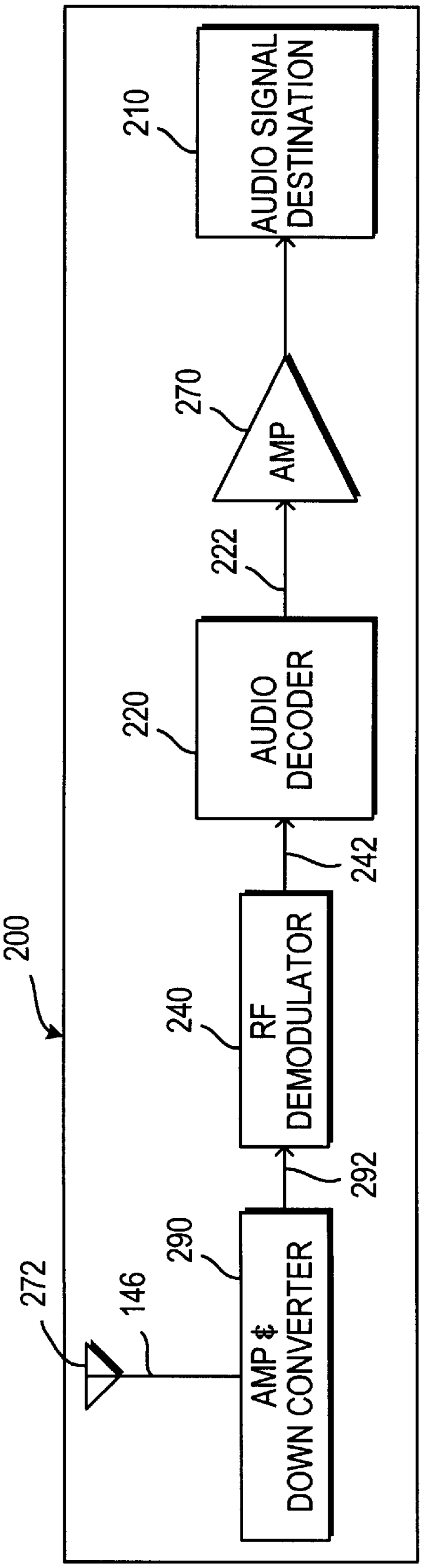
FIG. 2 is a block diagram of a receiver of a wireless speaker system configured according to the present invention.

Referring to the drawings in detail, FIGS. 1 and 2 are block diagrams of a transmitter and receiver, respectively, configured according to the present invention generally designated 100 and 200. The general operation of the transmitter 100 and receiver 200 will be discussed first, followed by a detailed description of the preferred embodiment including the specific circuits and operation thereof.

The transmitter 100 receives an analog input signal 112 from at least one of a plurality of audio signal sources 110. As used herein, an audio signal source may be, by way of non-limiting example, consumer radio receivers, compact disc players, cassette tape players, television (TV) sets, video cassette recorders (VCR), and other similar analog audio signal producing device. Each audio signal source 110 provides an analog input signal 112 to an audio encoder 120 which digitally encodes or frequency modulates the input signals 112 and mixes the digital and analog signals to produce a multi-toned output signal 122. In a preferred embodiment, the total number of input signals 112 to the encoder 120 is limited to five. The encoder 120 includes both an A/D encoder section 150 (FIG. 3) and an analog modulation section 180 (FIG. 4), as described in more detail below. Whether an analog audio signal is digitized or frequency modulated and filtered is a matter of user preference, and as such, the combination of digital and analog signals that make-up the multi-tone output signal 122 from the encoder 120 is dictated by user desirability.

Figure 7:
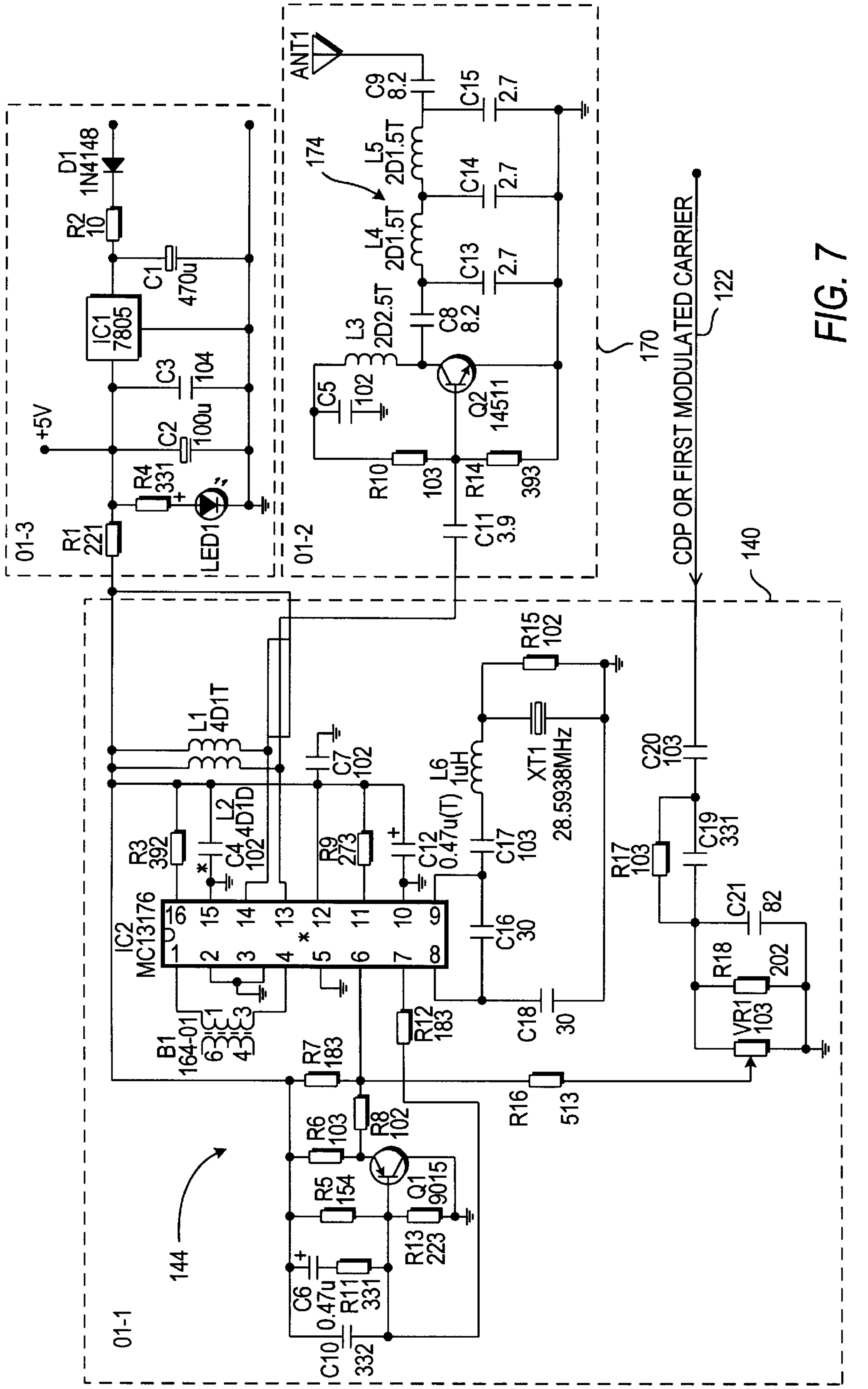
FIG. 7 is a schematic detail of the RF modulator and RF amplifier of FIG. 1.

The multi-tone output signal 122 from the encoder 120 is input to an RF modulator 140 where it modulates a phase-locked voltage controlled oscillator to produce a frequency modulated signal 142—the frequency modulated carrier preferably being over 900 MHz. The modulated signal 142 is then amplified by RF amplifier 170 (including a harmonic filter 174 (see FIG. 7)) to form an amplified signal 146 which is transmitted via antenna 172.

Referring next to FIG. 2, the receiver 200, which is preferably contained is a speaker enclosure, receives the amplified signal 146 via antenna 272 and downconverts and amplifies the received signal from the high-frequency transmission to an intermediate frequency (IF) signal 292 by the amplifier and downconverter section 290. An RF demodulator 240 removes the IF carrier frequency component, leaving only a demodulated signal 242 as input to the audio decoder 220—the signal 242 being the recovered multi-tone output signal 122 of the encoder 120. As described above for the transmitter 100, the demodulated signal 242 may include both digital and analog signal components—such composition being a matter of design choice, and as determined by the multi-tone output signal 122 generated by the audio encoder 120 in the transmitter 100.

The audio decoder 220 includes either a D/A section 250 (FIG. 10) or an analog demodulation section 280 (FIG. 11)—both sections being complementarily designed with the respective A/D section 150 and analog modulation section 180 of the transmitter 100.

In a preferred embodiment, each receiver 200 may be configured to receive either a digital or an analog signal—such configuration being inaccessible to the user. Accordingly, audio decoder 220 includes either an analog demodulation section 280 or a D/A section 250 and, consequently, only processes that portion of the demodulated signal 242 intended for the audio signal destination 210 to which the particular receiver 200 is connected, e.g. either an analog or digital signal for the right-front speaker, right-rear speaker, etc. The decoded analog output 222 of the audio decoder 220 is therefore an analog signal (decoded from a digitized or modulated analog signal) from a specific audio signal source 110. An amplifier 270 is provided between the audio decoder 220 and the signal destination 210 to boost the analog output 222.

As used herein, audio signal destination may refer to, by way of non-limiting example, a speaker, TV set and other similar acoustic devices and apparatuses.

Of the numerous A/D conversion techniques, the present invention advantageously employs continuously variable slope delta (CVSD) modulation. CVSD modulation tracks the peak amplitude of an analog signal over a certain period, e.g. the period of the analog signal, and "stores" the accumulated peak amplitude using, for example, a known integrator circuit or other similarly known amplitude detection circuits or devices. The CVSD modulation circuit compares the "stored" accumulated peak amplitude at a discrete point along the signal period with the peak amplitude of the analog signal at the same discrete point. If the difference between the peak amplitude and accumulated peak amplitude is a positive value, the CVSD output is a digital high or 1; if the difference between the amplitudes is a negative value, the output is a digital low or 0.

Figure 3:
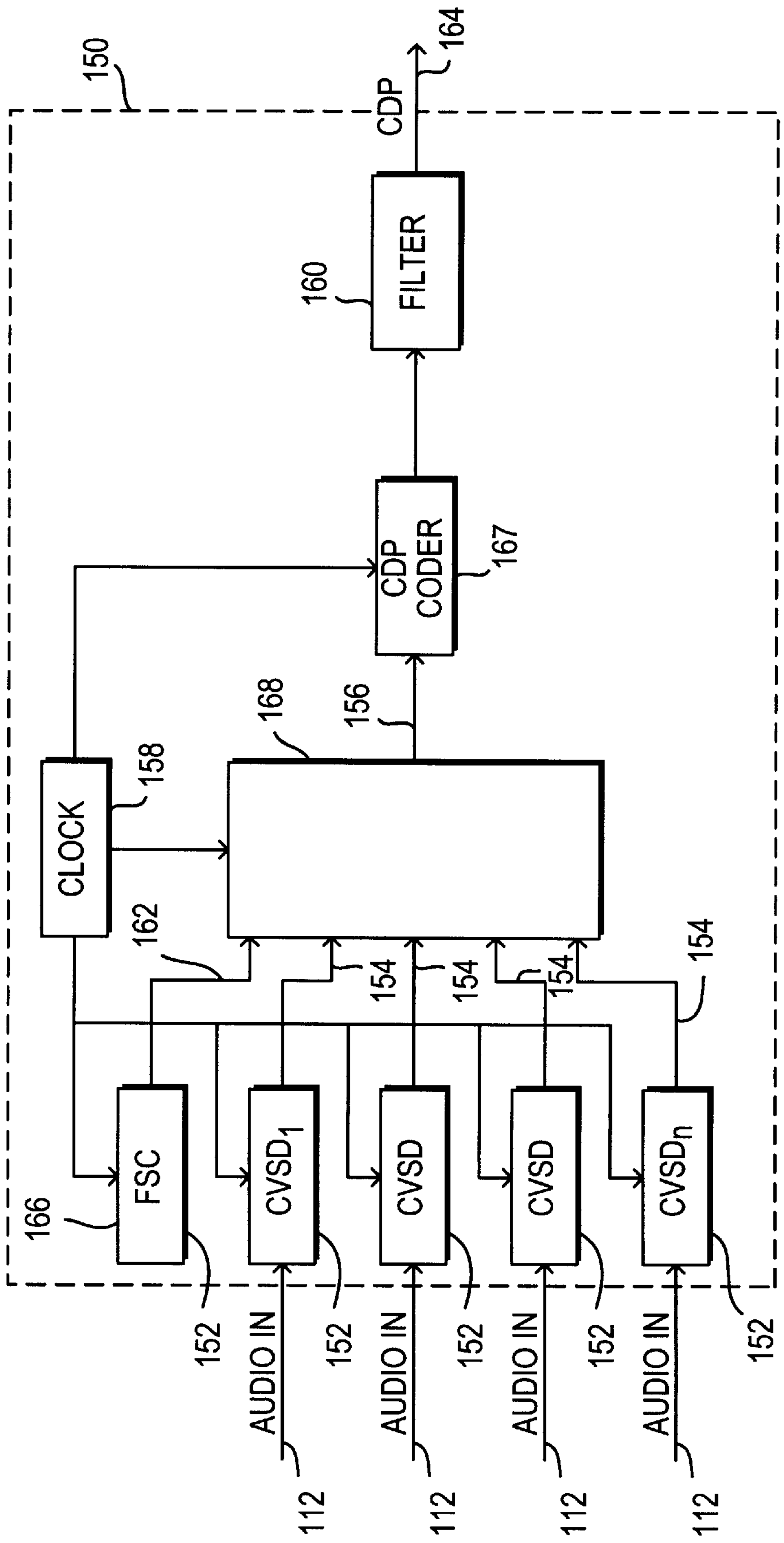
FIG. 3 is a block diagram of an analog-to-digital encoder section of the audio encoder of FIG. 1.
Figure 4:
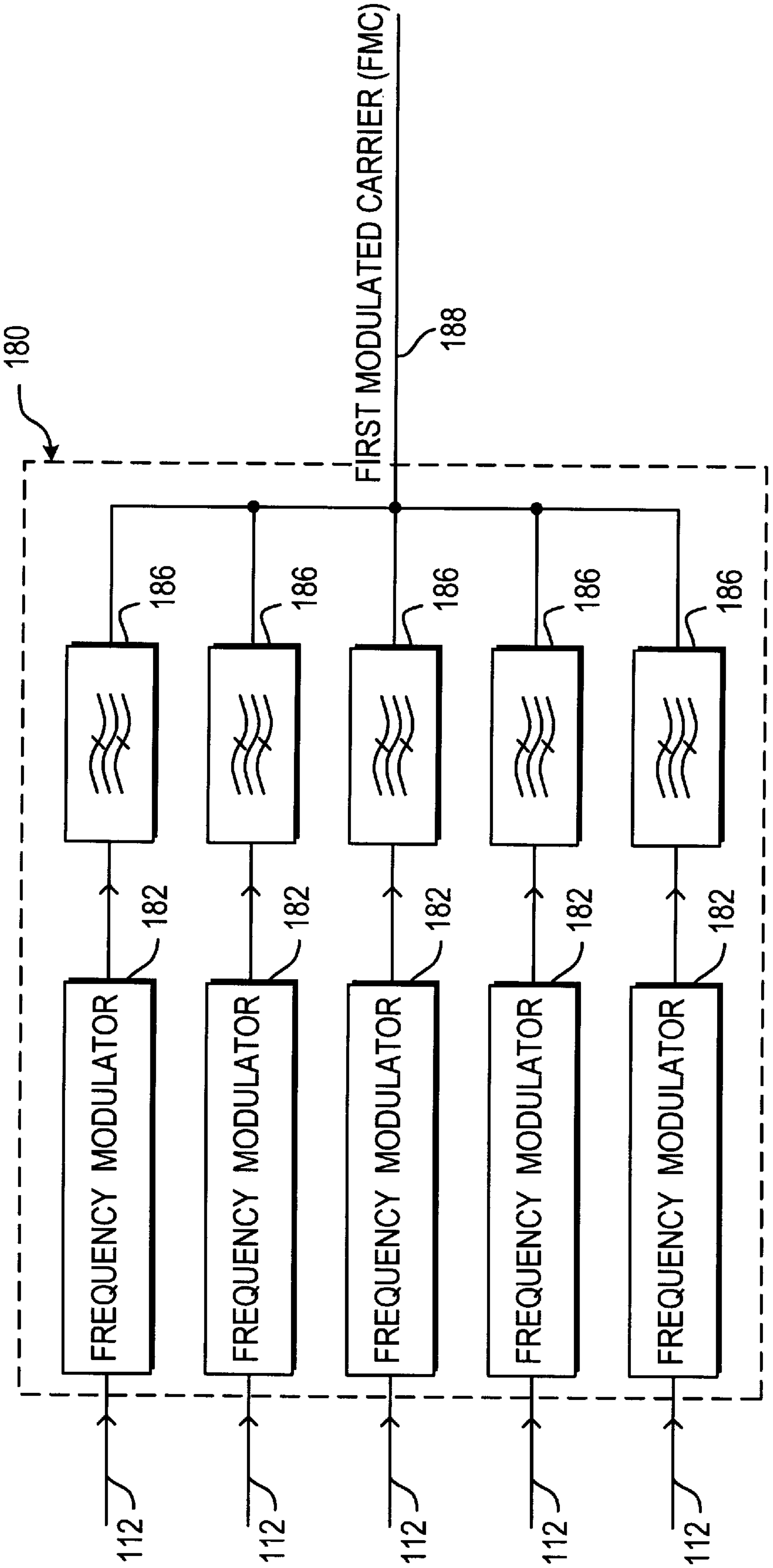
FIG. 4 is a block diagram of an analog modulation section of the audio encoder of FIG. 1.
Figure 5A:
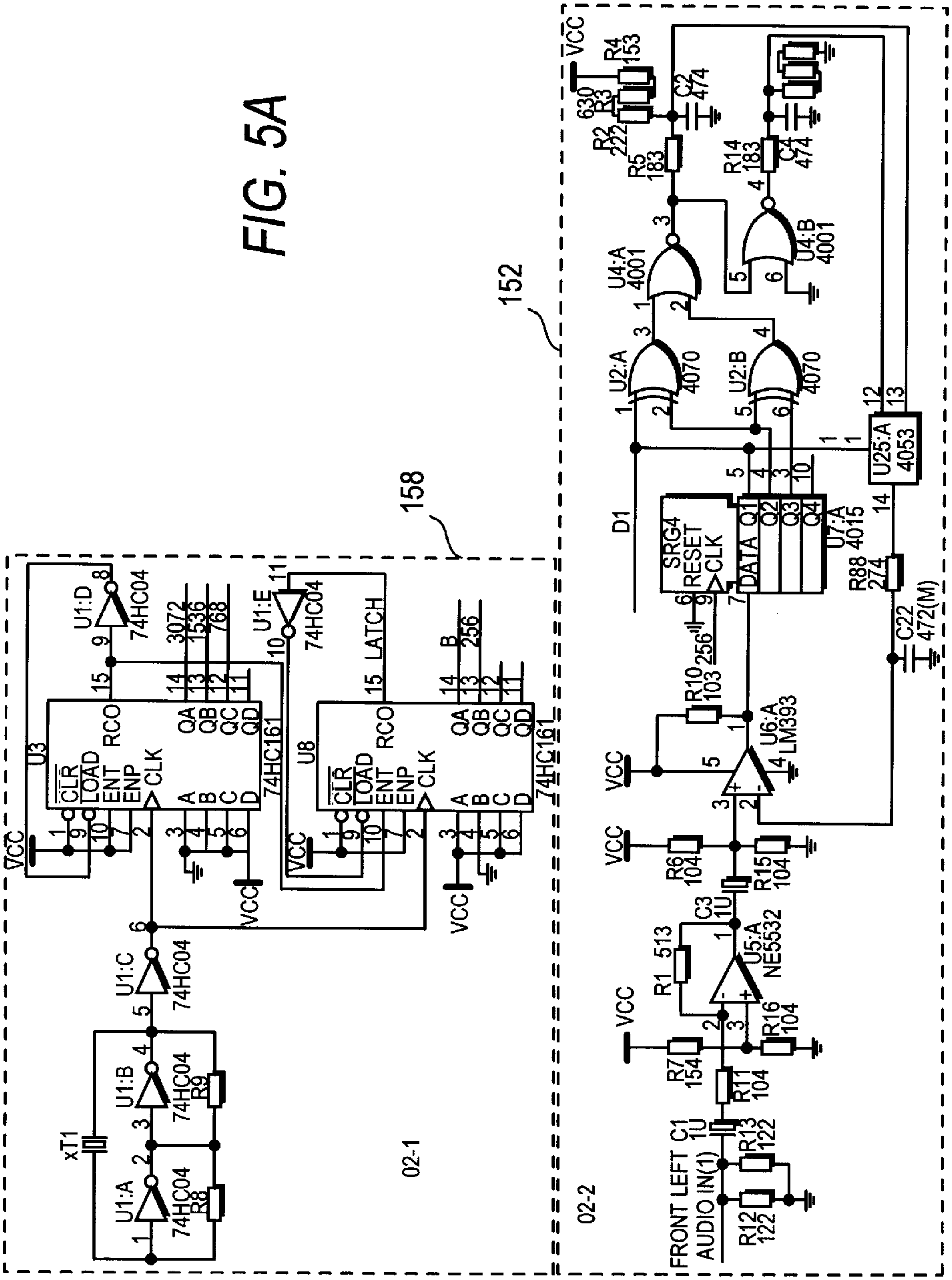
FIG. 5 is a schematic detail of FIG. 3.
Figure 5B:
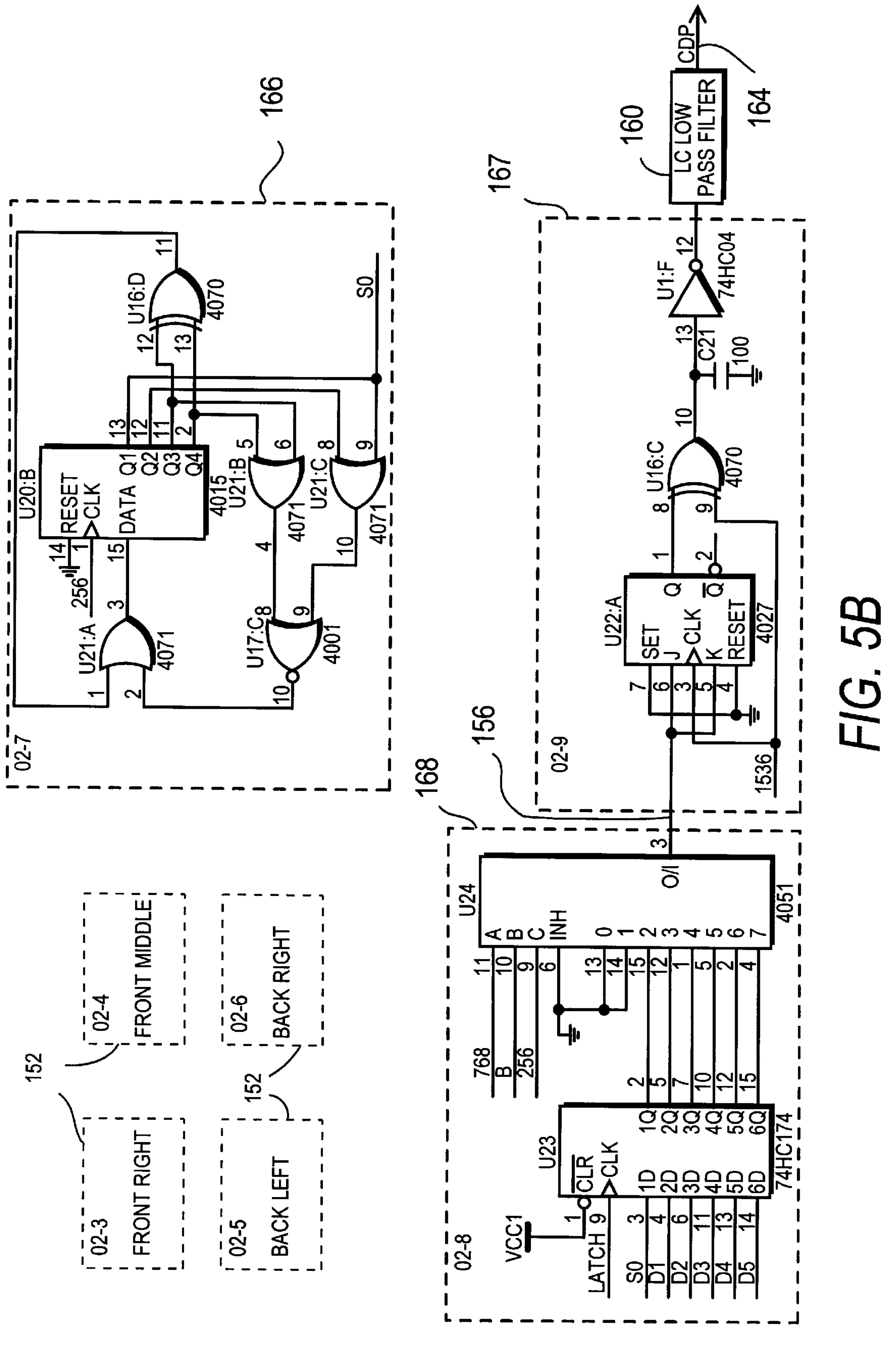

Referring next to FIGS. 3–7, the detailed operation of the transmitter 100 of the present invention will now be described. The A/D encoder section 150 of the transmitter 100 may be configured as a CVSD A/D converter 152 for each audio signal source 110, as shown in FIGS. 3 and 5. The CVSD converters 152 are labelled 1 through n for convenience in FIG. 3, with n being an integer between 0 and 5. Each CVSD converter 152 samples the input signal 112 at a rate of approximately 256 KHz and produces a serial bit-stream 154 representative of the input signal 112. The serial bit-streams 154 from the plural CVSD converters 152 are combined in multiplexer 168, along with a synchronization bit 162 generated by a frame synchronization code (FSC) circuit 166, to form a digital frame 156 at the output of the multiplexer 168 (see FIG. 14). In a preferred embodiment, the FSC circuit 166 generates a pseudo-random code which repeats after 15 bits—preferably having a pattern of 000100110101111. It will be recognized by those skilled in the art that other pseudo-random codes will provide the same degree of randomness as the preferred code previously described. The FSC synchronization bit 162 is used by the receivers 200 to synchronize the start of a digital frame 156. After the detection of the FSC bit 162, synchronization between the transmitter 100 and receiver 200 is complete. Since each receiver 200 is configured to reproduce an audio signal from a particular audio signal source 110, the receiver 200 need only process the specific bit in the bit-stream that corresponds to its associated audio signal source 110 (see FIG. 14).

The CVSD converter 152 sampling rate is arbitrary, and for high-fidelity stereo sound, 256 KHz is a reasonable choice to sufficiently capture the music content of the analog input signal 112. It should be noted that the number of CVSD converters 152 is also arbitrary, and consequently, so too is the length of the digital frame 156.

Figure 13:
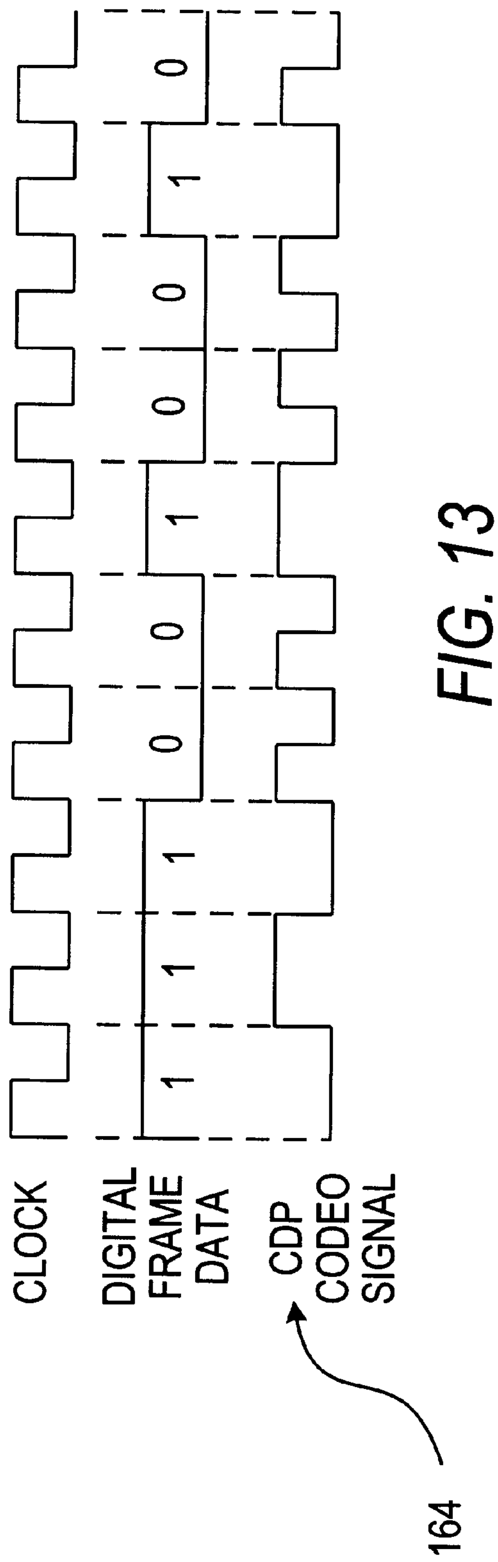
FIG. 13 is a timing diagram depicting the relationship among a clock signal, the data signal, and the conditional differential phase signal.

As can be further seen from FIG. 3, the digital frame 156 is further processed at 167 to form a Conditional Differential Phase (CDP) coded digital signal 164 having a waveform as illustrated in FIG. 13. The CDP coded digital signal 164 advantageously contains no DC voltage content, higher power density, and rich density and rich zero crossing information which makes it an ideal choice for wireless transmission. The CDP coded digital signal 164 shown in FIG. 13 behaves according to the following encoding rules: 1) if a specific bit in the digital frame 156 is a logic 1, the CDP coded signal 164 toggles on the rising edge of the timing signal from clock 158; and 2) if a specific bit in digital frame 156 is a logic 0, the CDP coded signal toggles on each rising and falling edge of the clock signal. The clock 158 is preferably stabilized by a 6.144 MHz crystal and may produce frequencies of approximately 256 KHz, 1,536 KHz, and 3,072 KHz.

Figure 14:
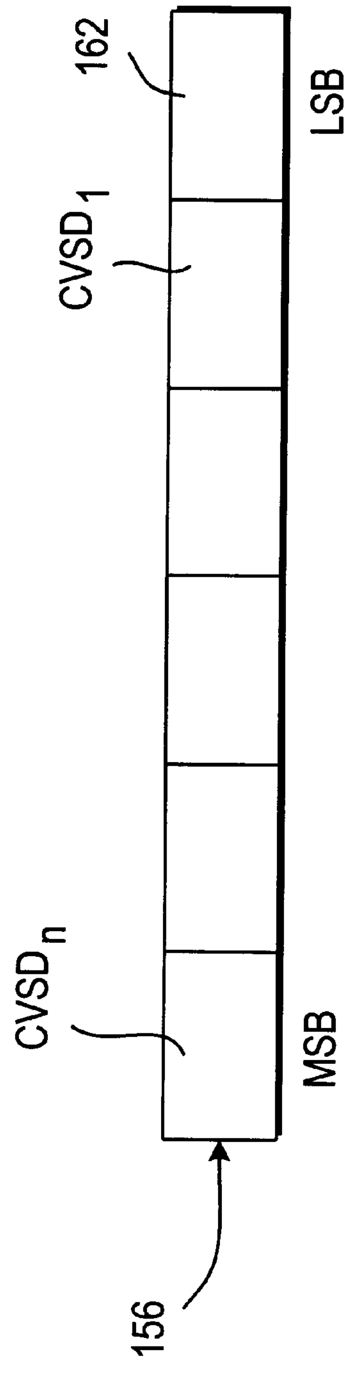
FIG. 14 is a diagram of a digital frame.

With this multiplexing scheme, the length of the digital frame 156 is equal to the number of CVSD converters 152 plus 1, i.e. 1 bit for each CVSD converter 152 plus 1 FSC synchronization bit 162 (see FIG. 14). Preferably, the least significant bit (LSB) of the digital frame 156 is the FSC bit 162, although the FSC bit 162 may alternatively be the most significant bit (MSB) or any other bit. Regardless of which bit comprises the FSC bit 162, the remaining bits correspond to data from the serial bit-streams 154 from the various CVSD converters 152. For the embodiment shown in FIG. 3, configured with five CVSD converters 152, the multiplexer output is thus six times the sampling rate of the CVSD converters 152, or 1.536 MHz.

Figure 6:
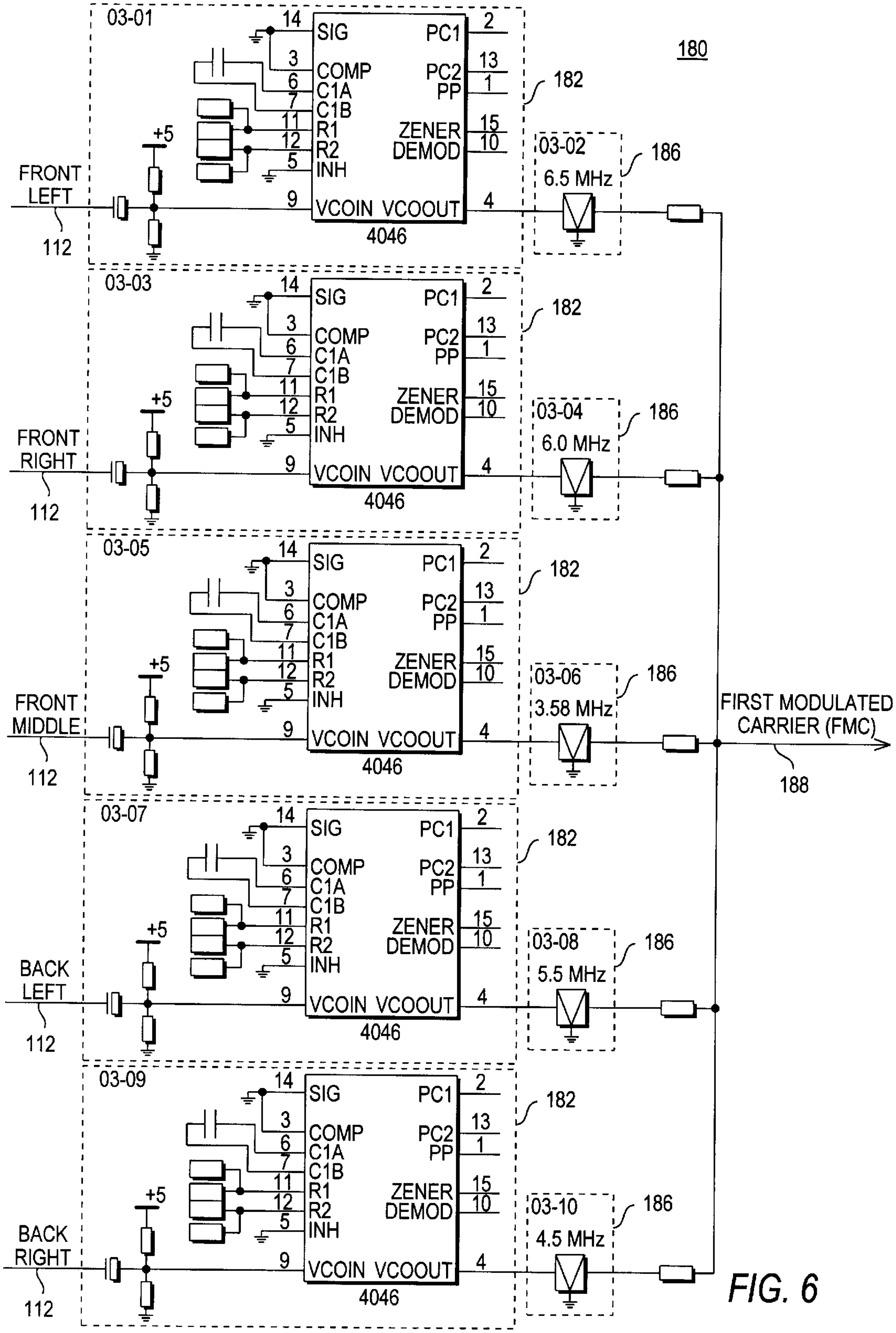
FIG. 6 is a schematic detail of FIG. 4.

Referring next to FIGS. 4 and 6, the analog modulation section 180 is configured as a plurality of frequency modulators 182, preferably configured as phase lock loop (PLL) circuits tuned to an arbitrarily selected frequency—preferably between approximately 150 KHz and 10.7 MHz. Each PLL circuit 182 is connected to a band-pass filter 186 tuned to the same frequency as the connected PLL circuit or modulator 182. The outputs of the band-pass filters 186 are combined through an isolating resistor to form a first modulated carrier (FMC) signal 188. The frequency of the FMC signal 188 is a matter of design choice and depends in part on the modulation and demodulation integrated circuits (ICs) and the ISM band used. The bandwidth of the band-pass filters 186 further restricts the available frequencies for the FMC signal 188, i.e. the filter bandwidth limits the minimum distance between the various analog signals that comprise the FMC signal 188. The FMC signal frequency must also be higher than the CDP coded frame frequency to further prevent overlap among the various audio signals that comprise the modulated signal 142.

Referring again to FIG. 1, all harmonics of the CDP coded signal 164 and FMC signals 188 (see description below) are preferably attenuated to at least –30 dbc by low-pass filter 160, resulting in relatively pure sinusoidal signals which may then be combined at the output of the audio encoder 120 to frequency-modulate the RF carrier generated in the RF modulator circuit 140 by a phase-lock loop (PLL) circuit 144 (FIG. 7) or other similar means.

It should be noted that the filtering is accomplished generally with low-cost ceramic filters or LC filters having approximately 20 db bandwidth at not more than approximately 20% of the center frequency of the filter. For example, ceramic filters manufactured by Murata (part numbers, SFT4.5MA, SFT5.5MA, SFSH3.58MCB, SFT6.0MA, SFT6.5MA) and LC filters manufactured by Sumida (part numbers, 74M-346, 74M-311, 74M322, 74M320) may be used according to the present invention.

Referring again to FIG. 2 and also FIGS. 8–12, the operation of the receiver 200 of the present invention will now be discussed in greater detail. One receiver 200 is required for each of the audio input sources 110 connected to the transmitter 100 with each receiver 200 being tuned to receive a modulated signal 142 from only one audio signal source 110, i.e. either an analog or a digital signal. As used herein, tuning, particularly as applied to the receiver 200, describes the selection of either analog or digital signal demodulation/conversion. The filtering frequencies of the various receivers 200 are preset and may not be changed by the user. Accordingly, each receiver 200 is configured to receive either an analog or a digital signal. Alternatively, the choice between analog or digital processing in each receiver 200 may be user selectable. In such an embodiment, the various analog and digital signal processing circuits described herein for the receiver 200 will be provided in each receiver 200.

Figure 8:
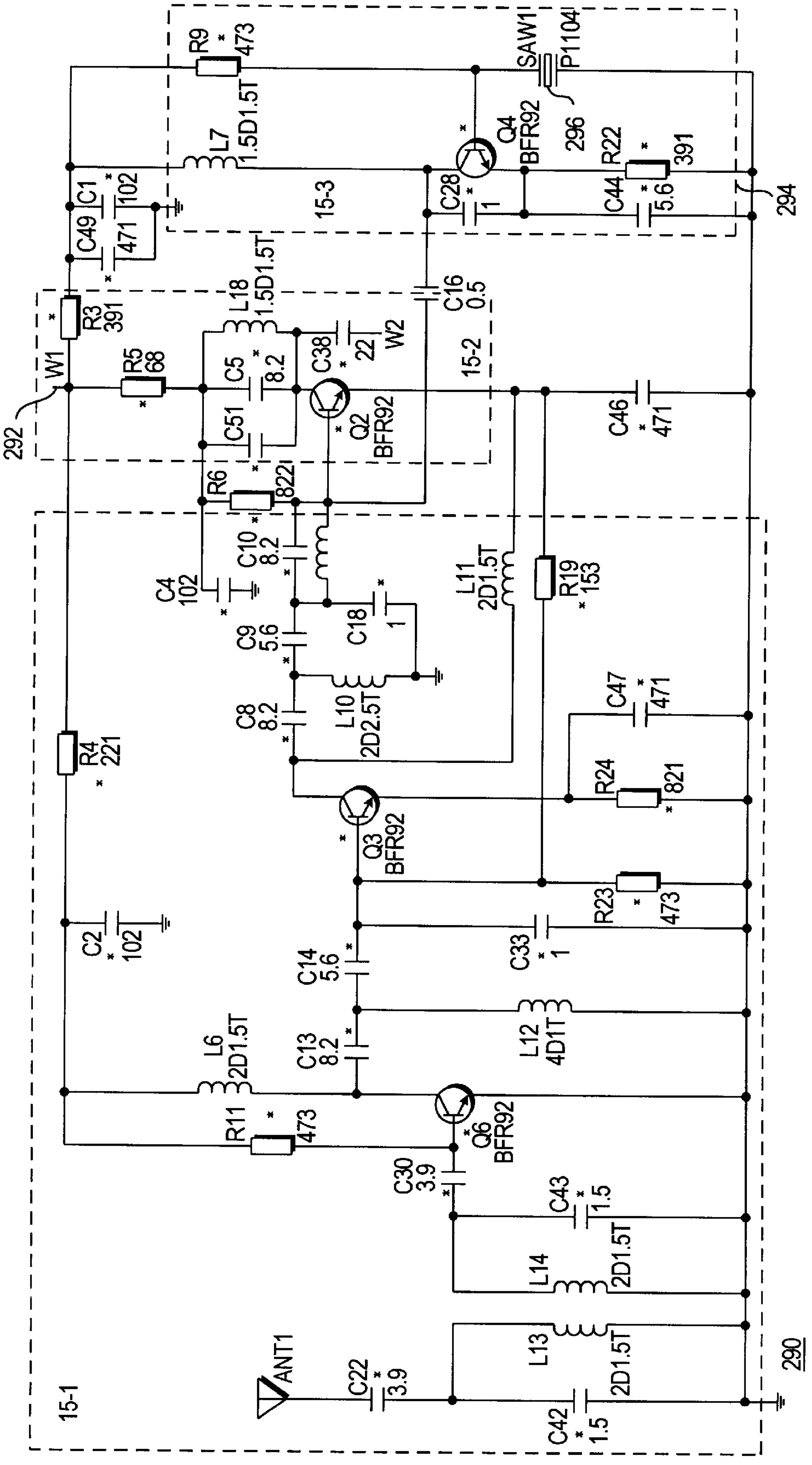
FIG. 8 is a schematic detail of the amplifier and down-converter of FIG. 2.
Figure 9:
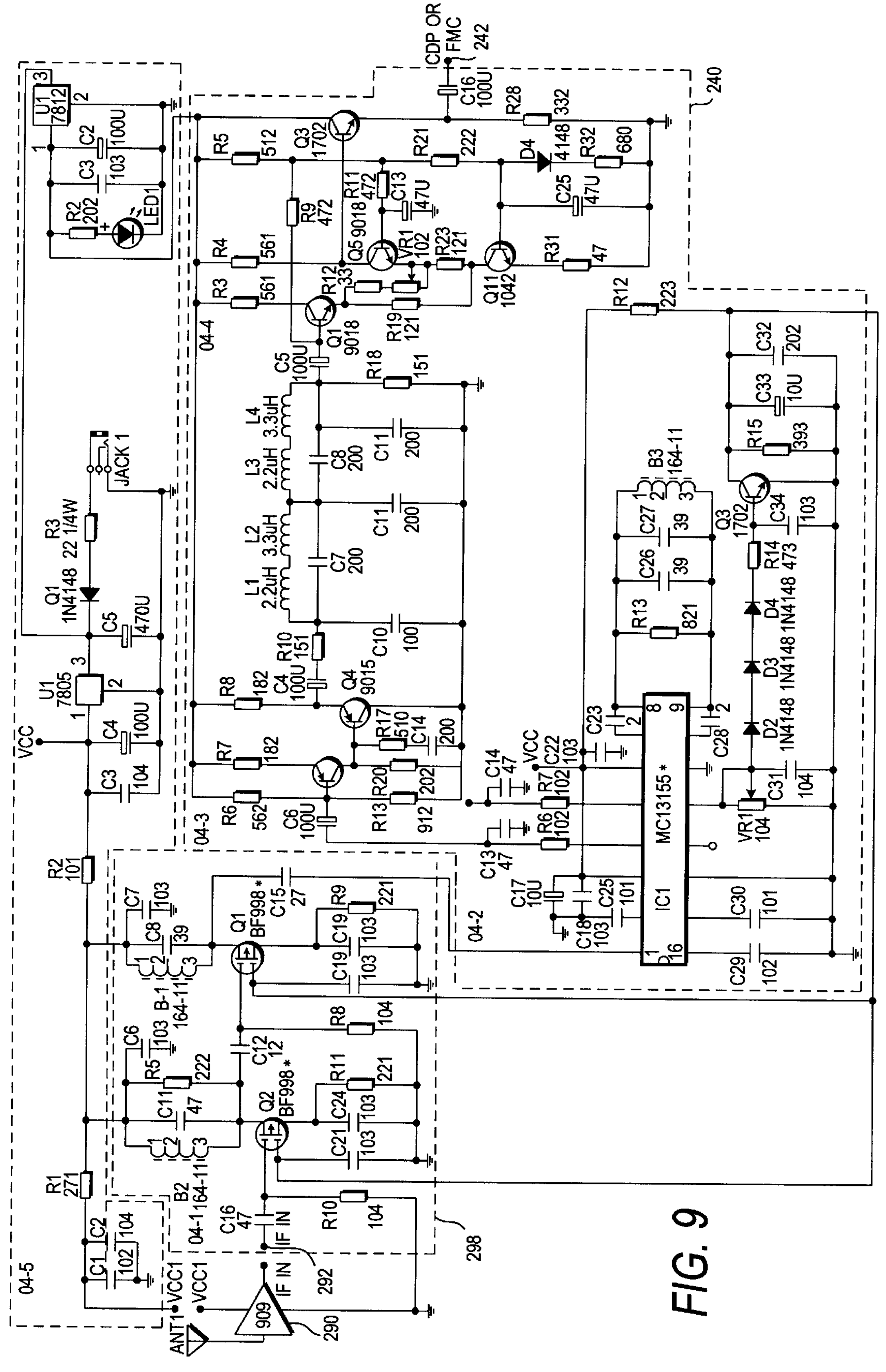
FIG. 9 is a schematic detail of the RF demodulator of FIG. 2.

The amplifier and downconverter section 290 first amplifies and down-converts the received modulated signal 142 to an intermediate frequency (IF) signal 292 of less than approximately 500 MHz using a local oscillator 294 running at approximately 854 MHz and stabilized by SAW resonator 296 (see FIG. 8). The specific design of the local oscillator 294 is a matter of design choice, subject only to the requirement that the selected circuit be stable to within 10% of the demodulation bandwidth of the IC (see, e.g. discussion below of part numbers CXA165, MC13155, MC13156, etc.) used in the receiver at the operating temperature range of interest.

The IF signal 292 is then amplified by an IF amplifier 298, included as part of the amplifier and downconverter section 290. The amplified IF signal is then demodulated, amplified and low-pass filtered by the RF demodulator 240, yielding a demodulated signal 242 (preferably the same as modulated signal 142) having both digital (CDP coded signal 164) and analog (FMC signal 188) parts. The audio decoder 220 filters the CDP coded digital signal 164 and frequency components of the FMC signal 188 from the demodulated signal 242 using the same type of filters corresponding to those in the transmitter, i.e. low-pass for the CDP signal (see FIG. 12) and band-pass for the FMC signal (see FIG. 11). The decoder 220 then frequency-demodulates (for FMC) or digitally decodes (for CDP) the demodulated signal 242 to produce a decoded analog output 222—which is then amplified by amplifier 270 and reproduced at audio signal destination 210.

In a preferred embodiment, the demodulator circuit 240 may include readily available ICs for demodulating the modulated IF signal 292 such as, for example, Sony part number CXA1165, configured for operation between 400 MHz and 500 MHz, Motorola part number MC13155, configured for operation below 300 MHz, and Motorola part number MC13156, configured for operation at 10.7 MHz. It will be obvious that other similarly configured ICs may provide the same functionality as the previously mentioned devices, which are indicated merely as examples. It should be noted that the demodulation bandwidth of the aforementioned ICs are different—specifically, 20 MHz, 10 MHz and 1 MHz respectively. Consequently, a narrower demodulation bandwidth requires that the CDP signal and FMC signal frequencies be correspondingly lower. For example, if the economical Motorola MC13156 is used, some channel capacity must be sacrificed—specifically, a maximum of 3 audio channels may be used. The modulated audio signal may then comprise either 2 digital channels and 1 analog channel, or 3 analog channels. In the first instance, the CDP coded digital signal 164 may be 768 KHz and the FMC may have a frequency component of 1 MHz, for example. In the second instance, there is no CDP component and the FMC may comprise a 200 KHz, 450 KHz and 700 KHz frequency components.

Figure 10:
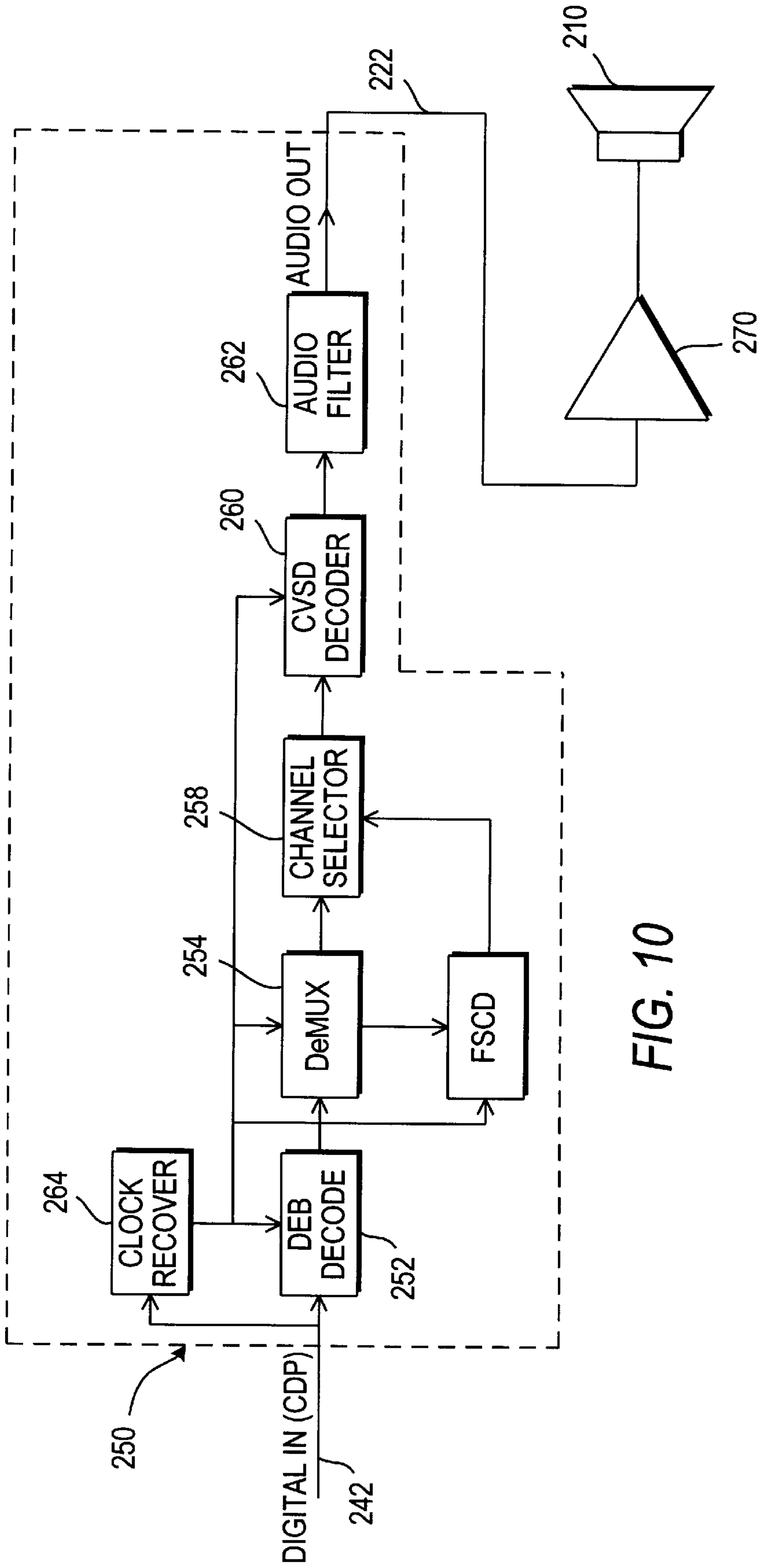
FIG. 10 is a block diagram of a digital-to-analog encoder section of the audio decoder of FIG. 2.
Figure 12A:
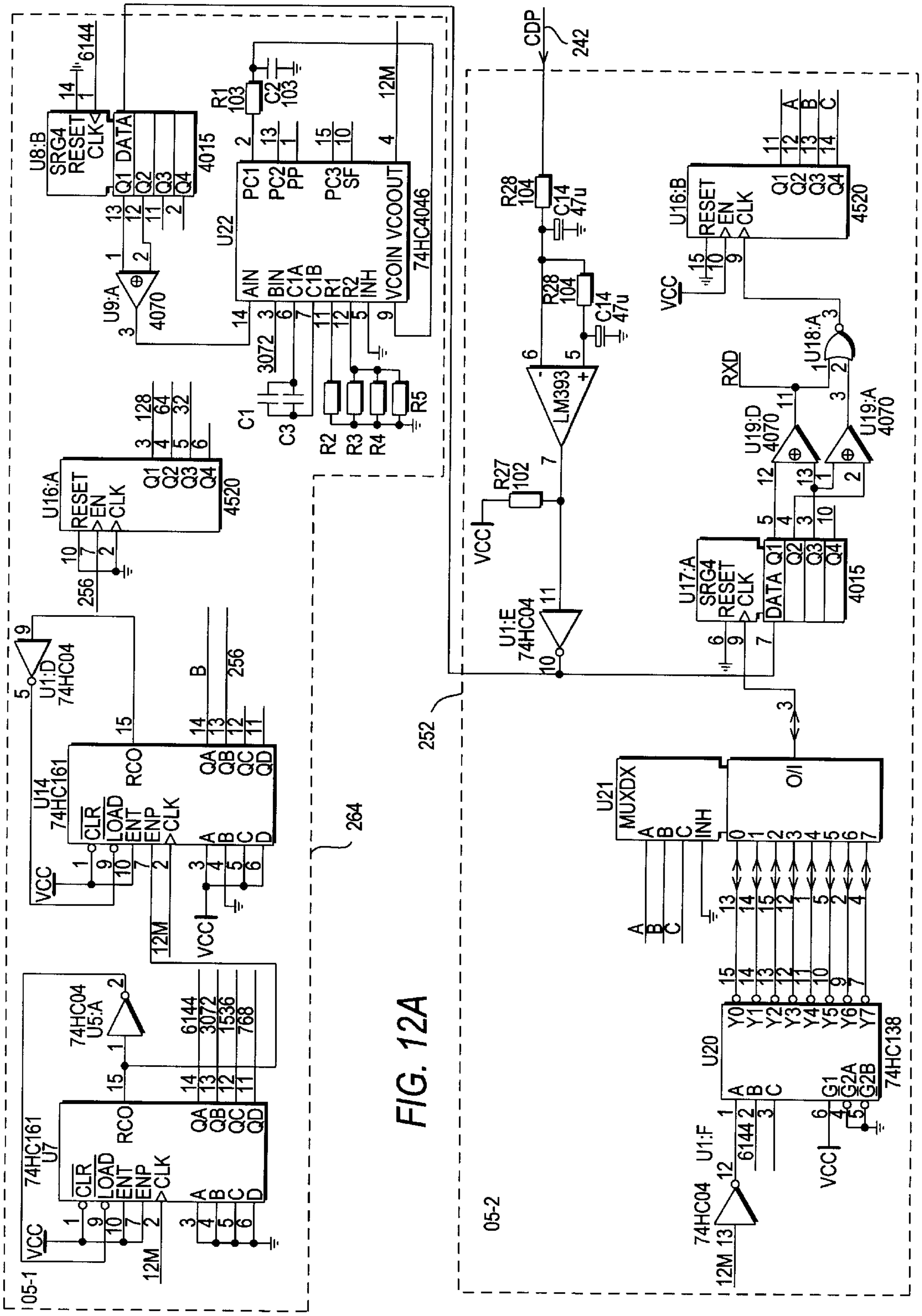
FIG. 12 is a schematic detail of FIG. 10.
Figure 12B:
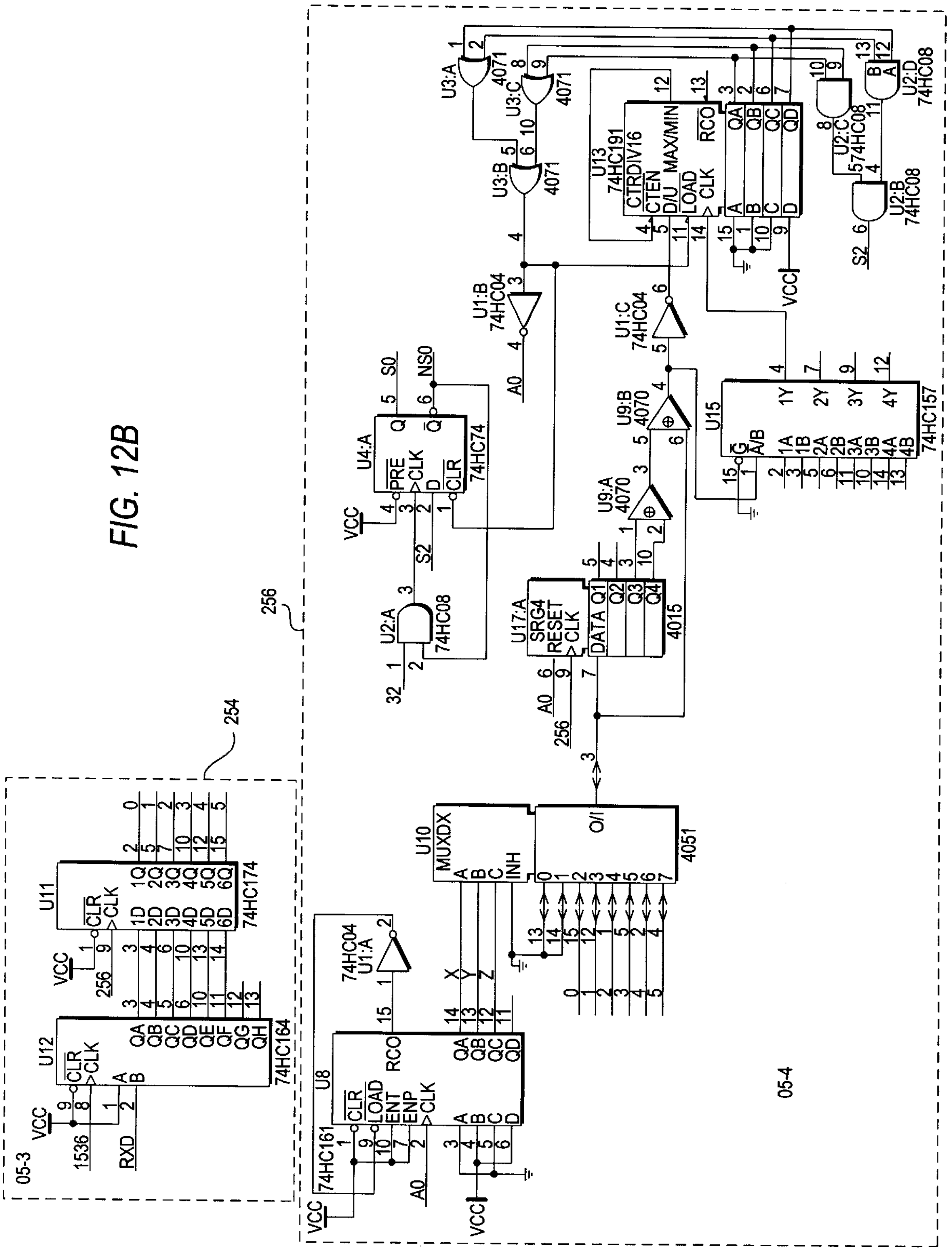
Figure 12C:
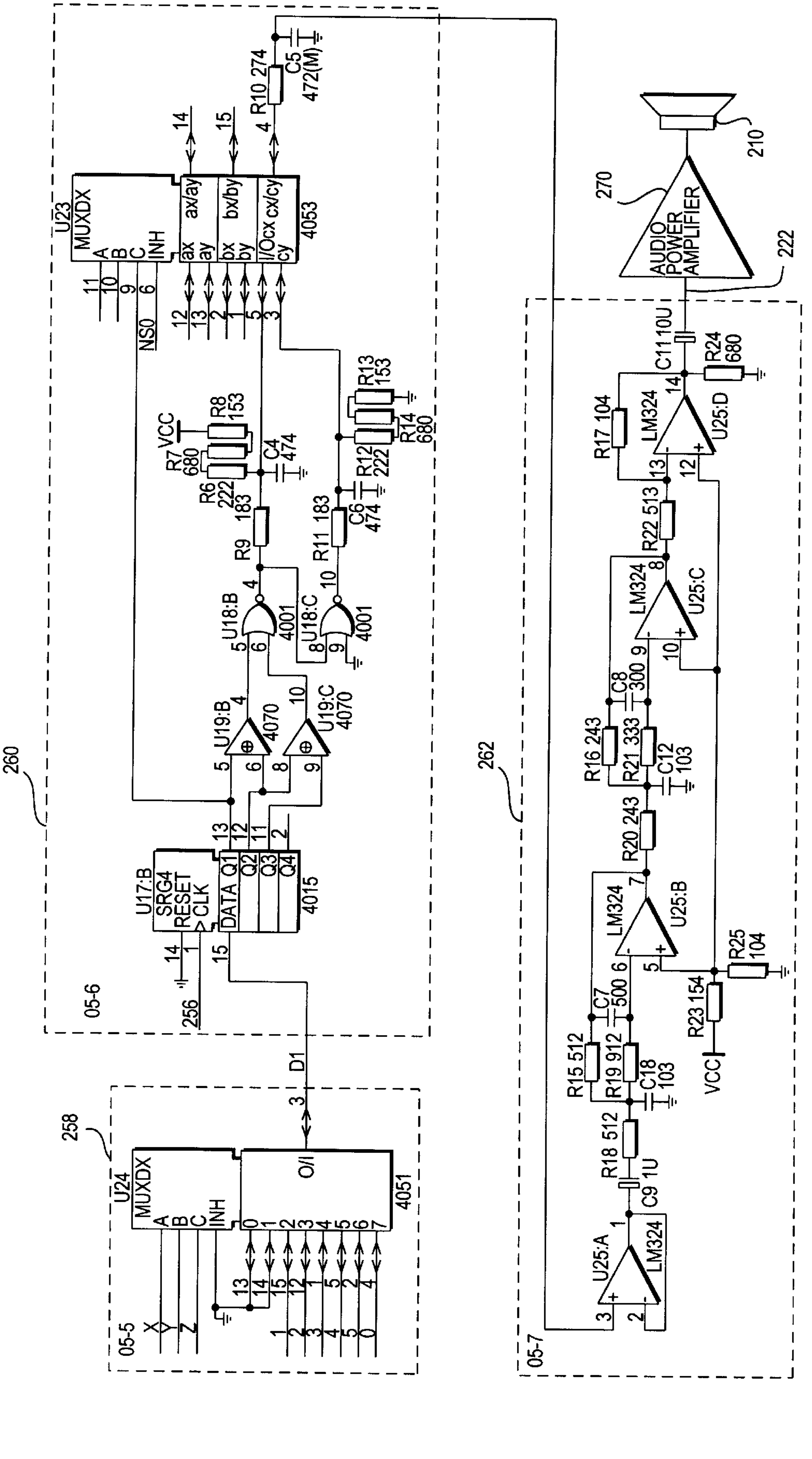

With continued reference to FIG. 2 and to FIGS. 10 and 12, and further discussing the D/A section 250 of the audio decoder 220, a demodulated signal 242 having a CDP coded digital signal portion 164 is fed to a CDP decoder 252 to remove the CDP component from the demodulated signal 242. The clock is also recovered from the demodulated signal 242 in a clock recovery circuit 264. The decoded CDP signal is next fed to a demultiplexer 254 to isolate the CVSD component intended for the specific audio signal destination 210 to which this particular receiver 200 is connected. The demultiplexed CVSD signal is output as parallel data from the demultiplexer to a FSC detector (FSCD) 256 and to a channel selector 258—the channel selector 258 outputting a serial bit-stream representing a digitized audio signal from a particular audio source 110 to the CVSD decoder 260. After CVSD decoding, i.e. D/A conversion, the recovered analog signal goes through two stages of active filtering by audio filter 262 to produce a decoded analog output 222 which is then amplified by an audio amplifier 270 and fed to the speaker 210.

Figure 11:
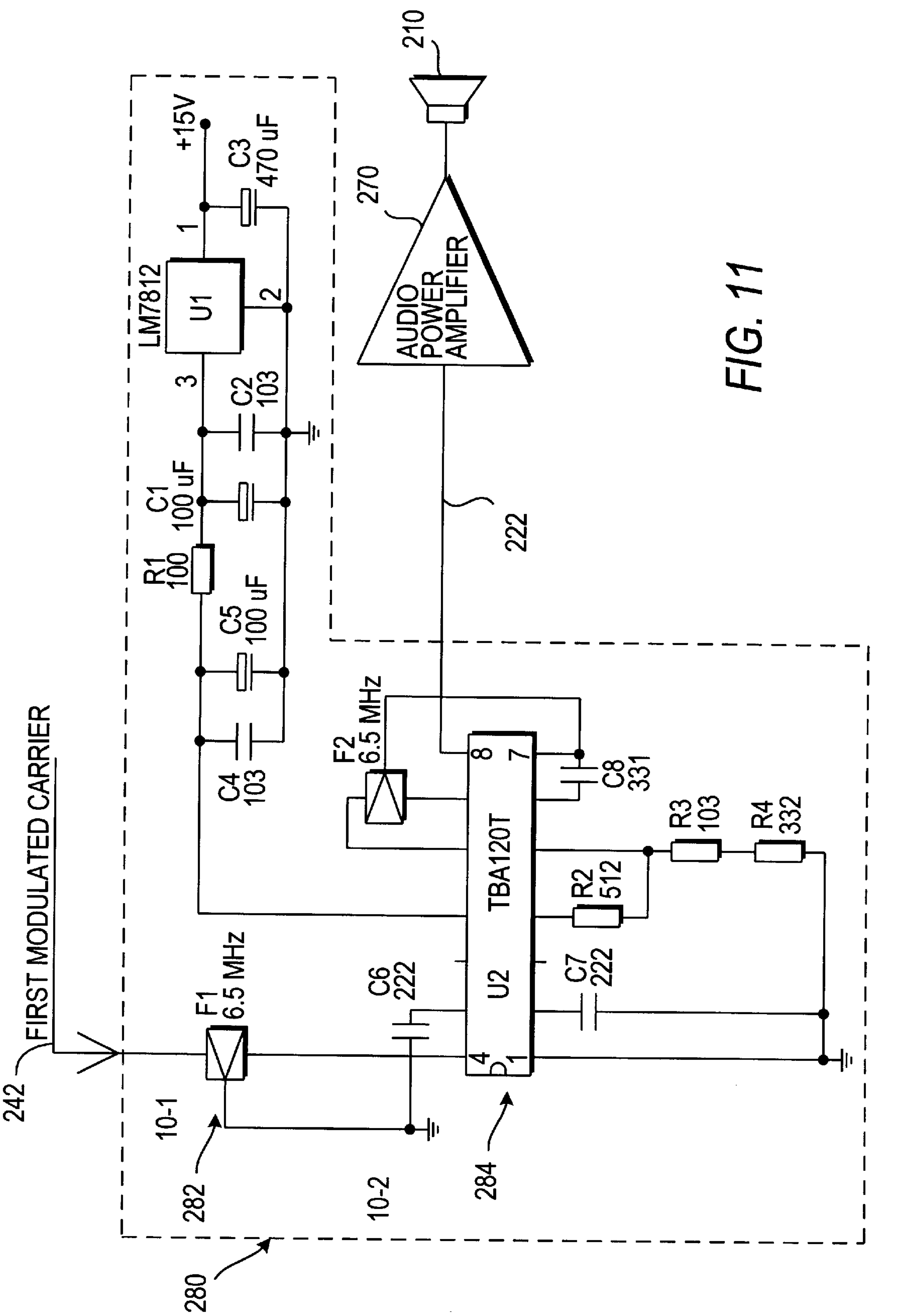
FIG. 11 is a block diagram of an analog demodulation section of the audio decoder of FIG. 2.

Referring next to FIG. 11, the analog demodulation section 280 of the audio decoder 220 will now be discussed. A demodulated signal 242 having an FMC signal portion 188 is input to a band-pass filter 282 to isolate the specific frequency component intended for the particular audio signal destination 210 and next to a demodulator circuit 284, yielding a decoded analog output 222 that is amplified at 270 and fed to the speaker 210.

Operation of the invention is preferably at carrier frequencies above 900 MHz. It is therefore possible to use known circuitry in the transmitter 100 to modulate the digital and analog audio signals, i.e. the CDP and FMC signals. In this way, the operating frequency is not limited by the present invention but, rather, is somewhat flexible, such that operation at 2.4 GHz or 5.7 GHz is also possible. For example, if operation at 5.4 GHz is desired, a known tripling circuit can be added following the 2.4 GHz PLL RF circuit as is known by those having ordinary skill in the art.

To achieve high-fidelity reproduction of the input signals 112, it is necessary to construct CVSD A/D and D/A converters using basic logic gates and operational amplifiers having a wide frequency range, e.g. up to 20 KHz, and high dynamic range of up to 60 db, for example.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A device for providing direct wireless communication between a signal source configured for producing a source audio signal having an amplitude and defining a signal period, and a signal destination configured for receiving the source audio signal, said device comprising:

a receiver for receiving a modulated signal; and a transmitter connected to the signal source for wirelessly transmitting said modulated signal to said receiver, said transmitter comprising:

an encoder connected to the signal source for forming, from the source audio signal, an encoded signal having a digital signal part comprising a digital frame having a plurality of digital bits, said digital signal part comprising a synchronization data portion and a signal source data portion, said encoded signal having a predetermined frequency defined by the product of said plurality of said digital bits and a predetermined sampling rate, said encoder comprising;

means for detecting amplitude values of the source audio signal at said predetermined sampling rate;

means for adding said detected amplitude values of the source audio signal over the signal period to form a detected amplitude sum; and means for comparing said detected amplitude sum to at least one of said detected amplitude values for generating an output digital bit representative of the difference between said detected amplitude sum and said at least one of said detected amplitude values, said digital bit comprising said signal source data portion; and a modulator connected to said encoder for combining said encoded signal with a carrier signal to form said modulated signal for wireless transmission to said receiver.

2. The device of claim 1, wherein said receiver is connected to the signal destination, said receiver further comprising:

a demodulator for recovering said encoded signal from said modulated signal, said recovered encoded signal having an amplitude and defining a signal period; and a decoder connected to said demodulator for converting said recovered encoded signal to the source audio signal.

3. The device of claim 2, wherein said recovered encoded signal comprises a digital signal part having a synchronization data portion and a signal source data portion, said recovered encoded signal having an amplitude and defining a signal period, said decoder further comprising:

means for detecting amplitude values of said recovered encoded signal at a predetermined sampling rate;

means for adding said detected amplitude values of said recovered encoded signal over the signal period to form a detected amplitude sum; and means for comparing said detected amplitude sum to at least one of said detected amplitude values for generating an output digital bit representative of the difference between said detected amplitude sum and said at least one of said detected amplitude values, said digital bit comprising said signal source data portion.

4. The device of claim 1, wherein said synchronization data portion comprises a pseudo-random digital code.

5. The device of claim 1, further comprising a filter connected to said modulator for filtering said modulated signal.

6. The device of claim 5, wherein said filter comprises a low-pass filter that attenuates all harmonics of said modulated signal to approximately −30 dB.

7. The device of claim 1, wherein said encoder further comprises means for coding said digital signal part.

8. A device for providing direct wireless communication between a signal source configured for producing a source audio signal having an amplitude and defining a signal period, and a signal destination configured for receiving the source audio signal, said device comprising:

a receiver for receiving a modulated signal; and a transmitter connected to the signal source for wirelessly transmitting said modulated signal to said receiver, said transmitter comprising:

an encoder connected to the signal source for forming, from the source audio signal, an encoded signal having a digital signal part, said digital signal part comprising a signal source data portion and a synchronization data portion having a pseudo-random digital code, said encoder comprising;

means for detecting amplitude values of the source audio signal at a predetermined sampling rate;

means for adding said detected amplitude values of the source audio signal over the signal period to form a detected amplitude sum; and means for comparing said detected amplitude sum to at least one of said detected amplitude values for generating an output digital bit representative of the difference between said detected amplitude sum and said at least one of said detected amplitude values, said digital bit comprising said signal source data portion; and a modulator connected to said encoder for combining said encoded signal with a carrier signal to form said modulated signal for wireless transmission to said receiver.

9. The device of claim 8, wherein said digital signal part comprises a digital frame.

10. The device of claim 9, wherein said digital frame further comprises a plurality of said digital bits.

11. The device of claim 10 wherein said encoded signal has a predetermined frequency defined by the product of said plurality of said digital bits and said predetermined sampling rate.

12. The device of claim 8, further comprising a filter connected to said modulator for filtering said modulated signal.

13. The device of claim 8, wherein said encoder further comprises means for coding said digital signal part.

14. A device for providing direct wireless communication between a signal source configured for producing a source audio signal having an amplitude and defining a signal period, and a signal destination configured for receiving the source audio signal, said device comprising:

a receiver for receiving a modulated signal; and a transmitter connected to the signal source for wirelessly transmitting said modulated signal to said receiver, said transmitter comprising:

an encoder connected to the signal source for forming, from the source audio signal, an encoded signal having a digital signal part, said digital signal part comprising a synchronization data portion and a signal source data portion, said encoder comprising;

means for coding said digital signal part means for detecting amplitude values of the source audio signal at a predetermined sampling rate;

means for adding said detected amplitude values of the source audio signal over the signal period to form a detected amplitude sum; and means for comparing said detected amplitude sum to at least one of said detected amplitude values for generating an output digital bit representative of the difference between said detected amplitude sum and said at least one of said detected amplitude values, said digital bit comprising said signal source data portion; and a modulator connected to said encoder for combining said encoded signal with a carrier signal to form said modulated signal for wireless transmission to said receiver.

15. The device of claim 14, wherein said receiver is connected to the signal destination, said receiver further comprising:

a demodulator for recovering said encoded signal from said modulated signal, said recovered encoded signal having an amplitude and defining a signal period; and a decoder connected to said demodulator for converting said recovered encoded signal to the source audio signal.

16. The device of claim 15, wherein said recovered encoded signal comprises a digital signal part having a synchronization data portion and a signal source data portion, said recovered encoded signal having an amplitude and defining a signal period, said decoder further comprising:

means for detecting amplitude values of said recovered encoded signal at a predetermined sampling rate;

means for adding said detected amplitude values of said recovered encoded signal over the signal period to form a detected amplitude sum; and means for comparing said detected amplitude sum to at least one of said detected amplitude values for generating an output digital bit representative of the difference between said detected amplitude sum and said at least one of said detected amplitude values, said digital bit comprising said signal source data portion.

17. The device of claim 14, wherein said digital signal part comprises a digital frame.

18. The device of claim 17, wherein said digital frame further comprises a plurality of said digital bits.

19. The device of claim 17, wherein said encoded signal has a predetermined frequency defined by the product of said plurality of said digital bits and said predetermined sampling rate.

20. The device of claim 14, wherein said synchronization data portion comprises a pseudo-random digital code.

21. A device for providing direct wireless communication between a signal source configured for producing a plurality of source audio signals having a plurality of respective amplitudes and defining a plurality of respective signal periods, and a signal destination configured for receiving the plurality of source audio signals, said device comprising:

a receiver for receiving a modulated signal; and a transmitter connected to the signal source for wirelessly transmitting said modulated signal to said receiver, said transmitter comprising:

an encoder connected to the signal source for forming, from the plurality of source audio signals, an encoded signal having an analog signal part and a digital signal part, said encoder comprising:

a first modulator for modulating at least one of the plurality of source audio signals to form said analog signal part; and a converter for forming, from another one of the plurality of source audio signals, a digital signal part comprising a synchronization data portion having a pseudo-random digital code, and a signal source data portion corresponding to said another one of the plurality of source audio signals; and a second modulator connected to said encoder for combining said encoded signal with a carrier signal to form said modulated signal for wireless transmission to said receiver.

22. The device of claim 21, wherein said analog signal part defines a second predetermined frequency.

23. The device of claim 21, wherein said digital signal part defines a first predetermined frequency, and wherein said analog signal part defines a second predetermined frequency, said second predetermined frequency being greater than said first predetermined frequency.

* * * * *